United States Patent
Yonezawa et al.

(10) Patent No.: US 8,090,516 B2
(45) Date of Patent: Jan. 3, 2012

(54) LANE DEVIATION PREVENTION DEVICE AND METHOD

(75) Inventors: Takeshi Yonezawa, Odawara (JP); Kou Sato, Atsugi (JP); Yasuhisa Hayakawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 647 days.

(21) Appl. No.: 12/273,747

(22) Filed: Nov. 19, 2008

(65) Prior Publication Data
US 2009/0132125 A1    May 21, 2009

(30) Foreign Application Priority Data

Nov. 20, 2007  (JP) .................................. 2007-300166
Jul. 28, 2008   (JP) .................................. 2008-193794

(51) Int. Cl.
*B62D 6/00*   (2006.01)
(52) U.S. Cl. .......................................... 701/82; 340/435
(58) Field of Classification Search .................... 701/82, 701/41, 96; 348/148; 340/425.5, 435, 438; 303/121, 140; 180/168, 170
See application file for complete search history.

(56) References Cited

U.S. PATENT DOCUMENTS 7,200,478 B2 * 4/2007 Iwasaka et al. ................. 701/70
7,571,053 B2 * 8/2009 Ishikura ......................... 701/301
2007/0100551 A1   5/2007 Ishikura

FOREIGN PATENT DOCUMENTS

| JP | 2006-175979 A | 7/2006 |
|----|---------------|--------|
| JP | 2006-178715 A | 7/2006 |
| JP | 2007-099124 A | 4/2007 |
| JP | 2007-122569   | 5/2007 |
| JP | 2007-122569 A | 5/2007 |

* cited by examiner

*Primary Examiner* — Dalena Tran
(74) *Attorney, Agent, or Firm* — Young Basile

(57) ABSTRACT

Disclosed herein are embodiments of controllers and methods of control to enable prevention of departure of vehicle even when the degree of the tendency of the vehicle to depart from the travel lane is low. One such controller comprises a lane departure tendency determining device configured to determine a departure tendency of the vehicle to depart from a travel lane, a yaw moment computing device configured to compute a reference yaw moment based on the departure tendency, a yaw moment correction device configured to compute a target yaw moment based on at least the reference yaw moment and a controller configured to apply the target yaw moment to the vehicle. When the reference yaw moment is lower than a prescribed threshold, the yaw moment correction device gradually increases the target yaw moment over time until the target yaw moment is greater than the prescribed threshold.

18 Claims, 10 Drawing Sheets

LANE DEVIATION PREVENTION DEVICE AND METHOD

CROSS-REFERENCE TO RELATED APPLICATIONS

This application claims priority from Japanese Patent Application Serial No. 2007-300166, filed Nov. 20, 2007, and No. 2008-193794, filed Jul. 28, 2008, each of which is incorporated herein in its entirety by reference.

TECHNICAL FIELD

The present invention relates to a lane departure prevention device and a method for lane deviation prevention.

BACKGROUND

An example of a lance departure prevention device is described in Japanese Kokai Patent Application No. 2007-122569. According to the lane departure control described in Japanese Kokai Patent Application No. 2007-122569, when it is judged that the vehicle is going to depart from the travel lane, a departure prevention output (yaw moment) is applied to the vehicle. By applying the yaw moment, departure of the vehicle from the travel lane is prevented.

BRIEF SUMMARY

Embodiments of a lane departure prevention device and method for a vehicle are taught herein. One such device is a controller including a lane departure tendency determining device configured to determine a departure tendency of the vehicle to depart from a travel lane, a yaw moment computing device configured to compute a reference yaw moment based on the departure tendency, a yaw moment correction device configured to compute a target yaw moment based on at least the reference yaw moment and a controller configured to apply the target yaw moment to the vehicle. When the reference yaw moment computed by the yaw moment computing device is lower than a prescribed threshold, the yaw moment correction device is further configured to gradually increase the target yaw moment over time until the target yaw moment is greater than the prescribed threshold.

This embodiment, its variations and other embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

As explained above, the lane departure control described in Japanese Kokai Patent Application No. 2007-122569 applies a departure prevention output (yaw moment) when it is judged that the vehicle is going to depart from the travel lane. This departure prevention output is a control quantity with a magnitude corresponding to the degree of the tendency of the vehicle to depart from the travel lane. The smaller the degree of departure tendency (for example, the yaw angle), the smaller the value of the departure prevention output. Consequently, even when the vehicle may depart from the travel lane, if the departure prevention output is set at a lower level there is no way to prevent departure of the vehicle caused by disturbances due to a rough road surface or the crowning of the road, and the driver may feel uneasy. On the other hand, if the departure prevention output is set at a higher level with respect to the degree of departure tendency, the behavior of the vehicle at the start of lane departure control changes abruptly, and the driver also feels uneasy.

The invention provides a type of lane departure prevention device and method that can prevent the departure of a vehicle from the travel lane without making the driver feel uneasy. Details of certain embodiments of the invention are explained herein with reference to figures.

Figure 1:
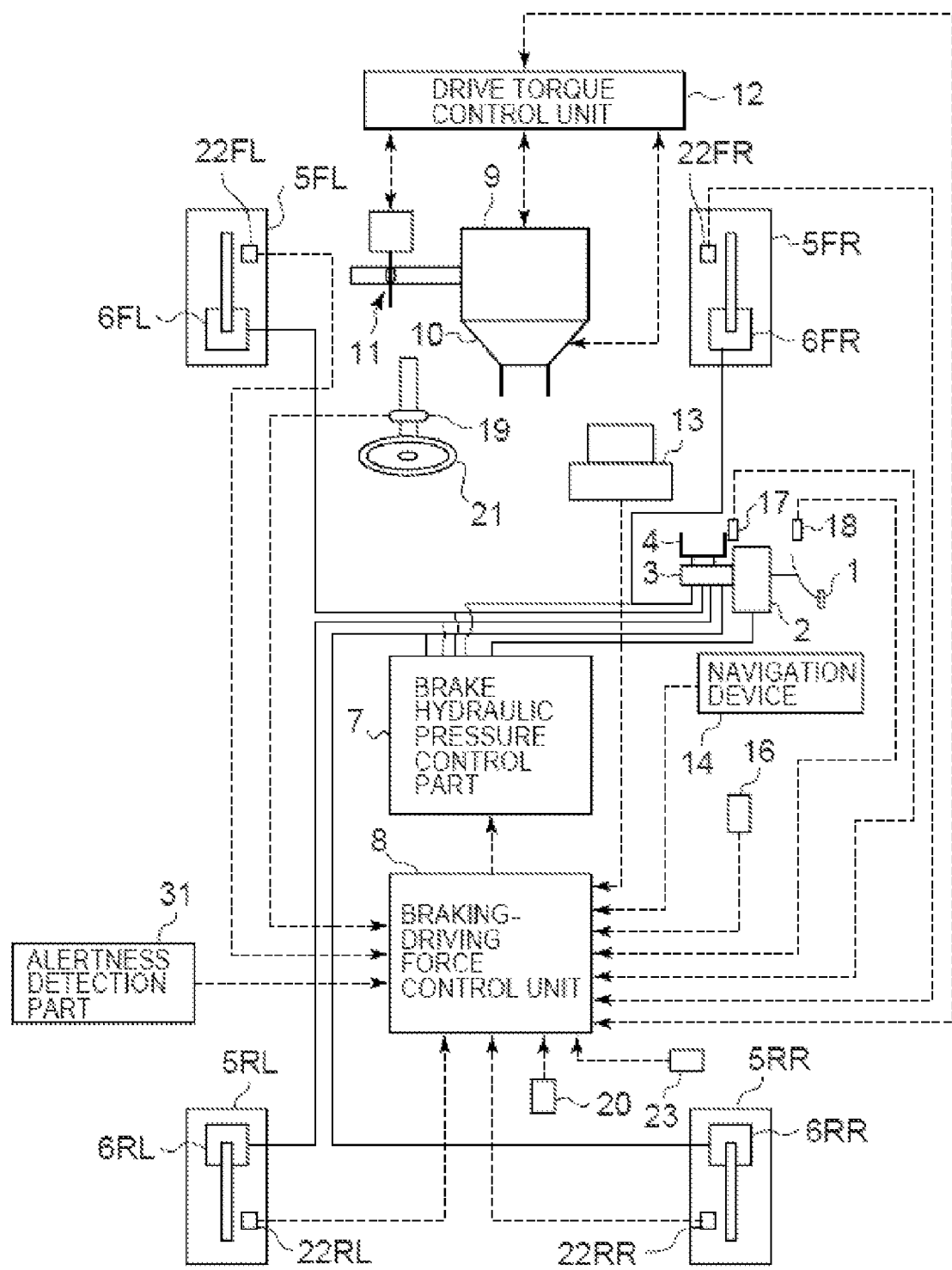
FIG. 1 is a schematic diagram illustrating a vehicle incorporating embodiments of the invention.

FIG. 1 is a schematic diagram illustrating the embodiments with reference to a rear wheel drive vehicle that carries the lane departure prevention device disclosed herein. The rear wheel drive vehicle has an automatic transmission and a conventional differential gear unit, and it is provided with a braking device that can independently control the braking forces of the left and right wheels for both the front and rear wheels.

The vehicle includes a brake pedal 1, a booster 2, a master cylinder 3 and a reservoir 4. Usually, the brake hydraulic pressure boosted by master cylinder 3 is supplied to wheel cylinders 6FL-6RR of wheels 5FL-5RR according to the depression distance of brake pedal 1 by the driver. Also, a brake hydraulic pressure controller 7 is arranged between master cylinder 3 and each of the wheel cylinders 6FL-6RR. Brake hydraulic pressure controller 7 enables individual control of the brake respective of hydraulic pressures for wheel cylinders 6FL-6RR.

For example, brake hydraulic pressure controller 7 makes use of the brake hydraulic pressure controller used in antiskid control and traction control. Brake hydraulic pressure controller 7 also allows independent control of the respective brake hydraulic pressures of wheel cylinders 6FL-6RR. Also, when the brake hydraulic pressure instruction value from a braking-driving force control unit 8, to be explained later, is input, brake hydraulic pressure controller 7 can control the brake hydraulic pressure corresponding to the brake hydraulic pressure instruction value.

For example, brake hydraulic pressure controller 7 may be configured with actuators in a hydraulic supply system. The actuators may be proportional solenoid valves that allow control of the hydraulic pressure of each wheel cylinder to any desired value.

Also, the vehicle is equipped with drive torque control unit 12. Here, drive torque control unit 12 controls the operating state of an engine 9, the selected gear ratio of an automatic transmission 10 and the throttle opening of a throttle valve 11. As a result, drive torque control unit 12 controls the drive torques to rear wheels 5RL, 5RR that are the driving wheels. Also, drive torque control unit 12 controls the fuel injection rate and the ignition timing, and at the same time, it controls the throttle opening so that the operating state of engine 9 is controlled. Drive torque control unit 12 outputs the value of drive torque Tw to braking-driving force control unit 8.

Drive torque control unit 12 can independently control the drive torques of rear wheels 5RL, 5RR. In addition, when a drive torque instruction value is input from braking-driving force control unit 8, drive torque control unit 12 also controls drive torque Tw according to the drive torque instruction value.

This vehicle is equipped with imaging capturing device or unit 13 having an image processing function. Imaging unit 13 is used to detect the lane departure tendency of the vehicle, and it detects the position of the vehicle within the travel lane. For example, imaging unit 13 is configured such that image pickup can be performed using a single lens CCD (charge coupling device) camera. Imaging unit 13 is arranged on the front of the vehicle.

Imaging unit 13 detects the white lines or other lane markers from the photographed image of the scene in front of the vehicle, and it detects the travel lane based on the detected lane markers. In addition, imaging unit 13 computes the angle (yaw angle) $\phi$ formed between the travel lane of the vehicle and the longitudinal axis of the vehicle, lateral displacement X from the center of the travel lane, and curvature $\beta$ of the travel lane, etc. Imaging unit 13 outputs these values to braking-driving force control unit 8.

Here a scheme can also be adopted in which the lane markers are detected other than through image processing. As a non-limiting example, the lane markers can be detected by means of plural IR sensors attached to the front of the vehicle, with the travel lane being detected based on the detection results.

However, embodiments of the invention are not restricted to the configuration in which the travel lane is determined based on the white lines. When white lines (lane markers) for recognizing the travel lane are not on the road, the following processing can be performed. From information about the road shape, surrounding environment, etc., that can be obtained by means of image processing and various types of sensors, the road region appropriate for vehicle travel and the road region where the driver should drive the vehicle are estimated, and these can be considered the travel lane. For example, when there are no white lines on the road, and there are cliffs on the two sides of the road, the asphalt portion of the road is determined to be the travel lane. When there are guard rails, curbs, etc., this information is taken into consideration in determining the travel lane.

Also, curvature $\beta$ of the travel lane can also be computed based on steering angle $\delta$ of a steering wheel 21, to be explained later.

The vehicle is equipped with navigation device 14. Navigation device 14 detects longitudinal acceleration Yg, lateral acceleration Xg and yaw rate $\phi'(=d\phi/dt)$ of the vehicle. Together with the road information, these values are output by navigation device 14 to braking-driving force control unit 8. Here, road information can include the number of lanes, whether the road is a conventional road or a highway, etc.

The various values can also be detected by means of dedicated sensors. That is, longitudinal acceleration Yg and lateral acceleration Xg can be detected by acceleration sensors, and yaw rate $\phi'$ can be detected by means of a yaw rate sensor.

Also, radar 16 can be installed on the vehicle. Radar 16 scans the area in front with a laser beam and receives the light reflected from a preceding obstacle so that the distance between the host vehicle and the preceding obstacle can be measured. Radar 16 then outputs the position information for the preceding obstacle to braking-driving force control unit 8. The detection results by radar 16 are used in processing for following control (cruise control) or a collision-avoidance speed decreasing braking device, etc.

The vehicle is also equipped with a master cylinder pressure sensor 17, a throttle opening sensor 18, a steering angle sensor 19, a direction indicating switch 20 and wheel speed sensors 22FL-22RR.

Master cylinder pressure sensor 17 detects the output pressure of master cylinder 3, that is, master cylinder hydraulic pressures Pmf, Pmr. Throttle opening sensor 18 detects the depression distance of the accelerator pedal 1, that is, throttle opening $\theta t$. Steering angle sensor 19 detects steering angle $\delta$ of steering wheel 21. Direction indicating switch 20 detects a direction indicating operation by means of turn signals. Wheel speed sensors 22FL-22RR detect the rotation speeds of wheels 5FL-5RR, that is, the so-called wheel speeds Vwi (i=fl, fr, rl, rr).

The detection signals from the sensors are output to braking-driving force control unit 8. Here, when detected running state data for the vehicle has left and right directionality, the rightward direction is always taken as the positive direction. That is, yaw rate $\phi'$, lateral acceleration Xg and yaw angle $\phi$ all have positive values for rightward turning. For lateral displacement X, a positive value is taken when the vehicle departs from the center of the travel lane to the right side. For longitudinal acceleration Yg, the value is positive for acceleration and negative for deceleration.

In the following, the processing of arithmetic and logic operations performed by braking-driving force control unit 8 will be explained with reference to FIG. 2. The control units, or parts, including controller 8 are implemented by, for example, conventional engine control units such as is known in the art. Each can thus be a microcomputer including a random access memory (RAM), a read-only memory (ROM) and a central processing unit (CPU), along with various input and output connections. Generally, the control functions described herein and associated with the respective controllers are performed by execution by the CPU of one or more software programs stored in ROM. Of course, some or all of the functions can be implemented by hardware components. Moreover, although several control units (or parts or controllers) are shown, the functions can be combined into a single controller.

Figure 2:
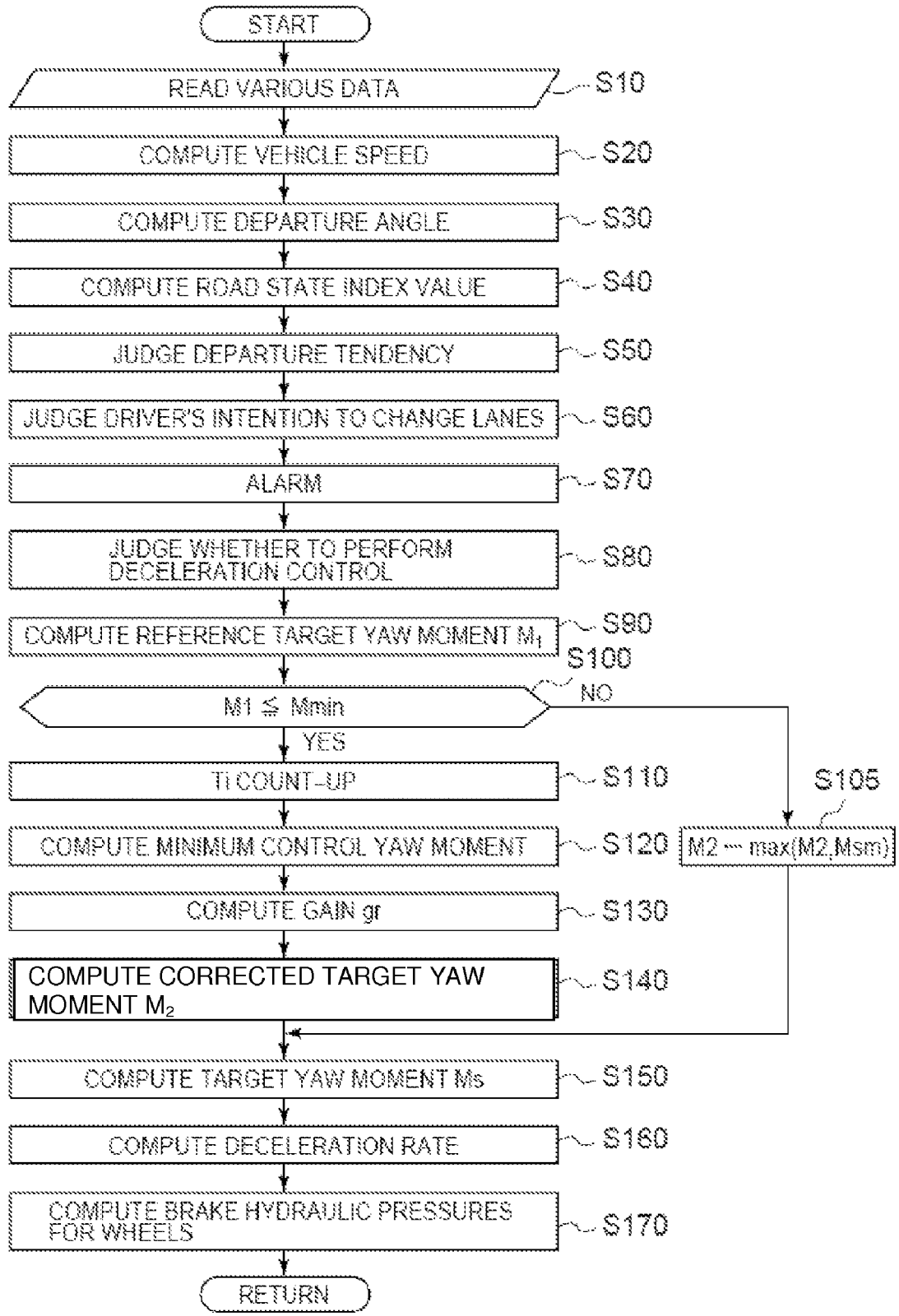
FIG. 2 is a flow chart illustrating the processing contents for a control unit of a lane departure prevention device pertaining to an embodiment of the invention.

FIG. 2 is a diagram illustrating the arithmetic and logic operational procedure performed by braking-driving force control unit 8 to prevent departure from the lane. The arithmetic and logic operations, for example, are performed at a timer interrupt for each prescribed sampling period $\Delta T$ of 10 msec. Also, communication processing is not included in the processing shown in FIG. 2. Information obtained in the arithmetic and logic operation is continuously updated and stored in a storage device, and information is read from the storage device as necessary.

First, processing is started in braking-driving force control unit 8. As a result, in step S10, various types of data are read from the sensors as well as from controllers and control units. More specifically, road friction coefficient $\mu$ obtained from road friction coefficient $\mu$ detector 23, and longitudinal acceleration Yg, lateral acceleration Xg, yaw rate $\phi'$ and road information obtained from navigation device 14 are read. Also, wheel speeds Vwi, steering angle $\delta$, throttle opening $\theta t$, master cylinder hydraulic pressures Pmf, Pmr and directional switch signals detected by the various sensors are read. In addition, drive torque Tw from drive torque control unit 12, yaw angle $\phi$ from imaging unit 13, as well as lateral displacement X (X0) and travel lane curvature $\beta$ are read. The road friction coefficient $\mu$ includes the friction or drag between the wheels and the road due to various road conditions and textures.

Then, vehicle speed V is computed in step S20 based on wheel speeds Vwi read in step S10 and using the following equation (1):

In the case of front wheel drive: $V=(Vwr1+VWrr)/2$;
or

In the case of rear wheel drive: $V=(Vwf1+VWfr)/2$.

Here, Vwf1, Vwfr represent the respective wheel speeds of the left and right front wheels, and Vwr1, Vwrr represent the respective wheel speeds of the left and right rear wheels. That is, the equations compute vehicle speed V as the mean value of the wheel speeds of the non-drive wheels. In this embodiment, because the vehicle is the rear wheel drive type, the latter equation is adopted to compute vehicle speed V from the wheel speeds of the front wheels.

The computed vehicle speed V is preferably adopted in the normal running state. When ABS (anti-lock brake system) control or other automatic braking control or the like is performed, the estimated vehicle body speed determined for ABS control or the like is used as the vehicle speed V. The value used as navigation information by navigation device 14 can also be used as vehicle speed V.

In step S30, as departure angle $\phi t$ of the vehicle, yaw angle $\phi$ and travel lane curvature $\beta$ obtained in step S10 are used, and the following equation (2) is used to compute departure angle $\phi t$ of the vehicle with respect to the travel lane:

$$\phi t=\phi+\beta. \quad (2)$$

In step S40, road condition index value N indicating the roughness of the road (roughness of roughness of the road) is computed using the following equation (3):

$$N=f1(\phi', \phi0'). \quad (3)$$

Here, function f1 is a function for computing the variability value for yaw rate $\phi'$, with yaw rate $\phi'$ in each processing period being taken as the sample value, and with $\phi 0'$ being taken as the sample means. That is, the precondition is that there is a close correlation between the variation in yaw rate $\phi'$ and the roughness of the road. With this precondition, road condition index value N indicating the roughness of the road is determined from the variability value for yaw rate $\phi'$. More specifically, the larger the variability value, the larger (higher) the roughness of the road is, and the larger the road condition index value N becomes.

Figure 3:
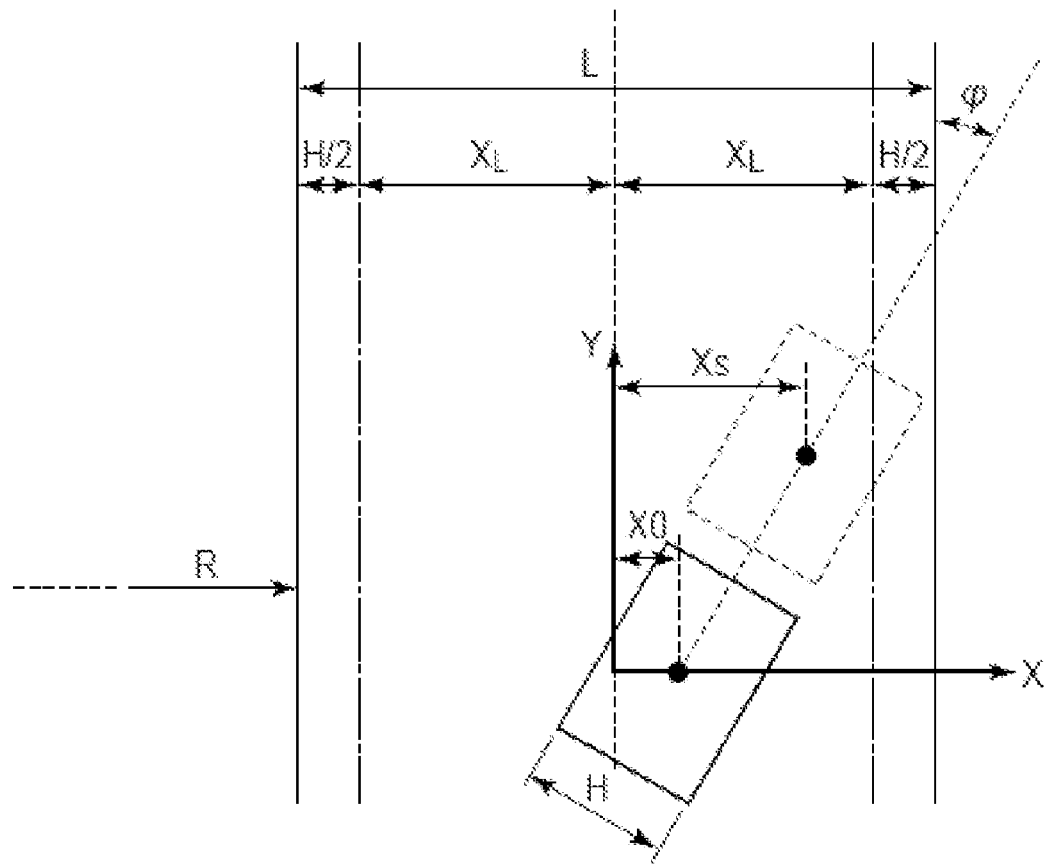
FIG. 3 is a diagram illustrating estimated lateral displacement Xs and threshold XL for judging departure tendency pertaining to an embodiment of the invention.

Then, in step S50, the lane departure tendency is judged. In the processing performed in step S50, yaw angle $\phi$, travel lane curvature $\beta$ and current vehicle lateral displacement X0 obtained in step S10, as well as vehicle speed V obtained in step S20, are used. Here, first of all, equation (4) is used to compute estimated future lateral displacement Xs as shown in FIG. 3:

$$Xs=Tt\cdot V\cdot(\phi+Tt\cdot V\cdot \beta)+X0. \quad (4)$$

Here, Tt represents the headway time for computing the forward viewing distance. The forward viewing point distance can be obtained by multiplying host vehicle speed V by the headway time Tt. That is, the estimated lateral displacement of the host vehicle from the center of the travel lane after headway time Tt has elapsed becomes estimated future lateral displacement Xs.

According to equation (4), for example, as far as yaw angle $\phi$ is concerned, the larger the yaw angle $\phi$, the larger the value of estimated future lateral displacement Xs. Then, by comparing the computed estimated lateral displacement Xs to prescribed threshold $X_L$ for judging the departure tendency, the lane departure tendency is assessed.

Here, threshold XL for judging the departure tendency is a value that usually allows determination that the vehicle has a lane departure tendency, and it can be obtained by experiment or the like. For example, as shown in FIG. 3, threshold $X_L$ for judging the departure tendency is a value indicating the position of a boundary line of the road, and it can be computed using the following equation (5):

$$X_L=(L-H)/2; \text{ wherein} \quad (5)$$

L represents the lane width; and
H represents the vehicle width.

Lane width L can be obtained as imaging unit 13 performs processing of the photographed image. Also, the position of the vehicle can be obtained by means of navigation device 14, and lane width L can be obtained by means of the map data of navigation device 14.

As shown in FIG. 3, threshold $X_L$ for judging the departure tendency (also referred to as lateral departure threshold distance $X_L$) is set within the travel lane of the vehicle. Alternatively, threshold XL for judging the departure tendency may be set on the outer side of the travel lane.

The operation is not restricted to the scheme of judging the departure tendency before the vehicle departs from the travel lane. For example, threshold XL for judging the departure tendency may be set such that the departure tendency is judged after at least one wheel has departed from the lane.

Here, when following equation (6) is satisfied, it is judged that the lane departure tendency is high, or that the degree of the lane departure tendency is high, and departure judgment flag Fout is turned ON (Fout=ON):

$$|Xs|\geq X_L. \quad (6)$$

On the other hand, when the following equation (7) is satisfied, it is judged that there is no lane departure tendency or that the lane departure tendency degree is low, and departure judgment flag Fout is turned OFF (Fout=OFF):

$$|Xs|<X_L. \quad (7)$$

Here, judgment about departure direction Dout is made based on lateral displacement X. More specifically, when lateral displacement is made from the center of the lane toward the left-hand side, this direction is taken as departure direction Dout (Dout=left). On the other hand, when there is a lateral displacement from the center of the lane to the right-hand side, this direction is taken as departure direction Dout (Dout=right).

Then, in step S60, the intention of the driver to change lanes is assessed. More specifically, based on the directional switch signal and steering angle δ obtained in step S10, a judgment is made as to the intention of the driver to change lanes.

That is, when the direction indicated by the directional switch signal (blinker ON side) and the direction indicated by departure direction Dout obtained in step S50 are the same, it is judged that the driver intends to change lanes. Here, departure judgment flag Fout is turned OFF (Fout=OFF). That is, the judgment result is changed to an intention to change lanes.

On the other hand, when the direction indicated by the directional switch signal (blinker ON side) and the direction indicated by departure direction Dout obtained in step S50 differ from each other, departure judgment flag Fout is kept as is. That is, departure judgment flag Fout is kept ON as is (Fout=ON). That is, the judgment result that there is no intention to change lanes.

When direction indicating switch 20 is not manipulated, the intention of the driver to change lanes is judged based on steering angle δ. That is, when the driver turns the steering wheel in the departure direction, since both steering angle δ and the steering angle rate of change (amount of change per unit time) Δδ exceed the prescribed values, it is judged that the driver intends to change lanes. In the case of the judgment, departure judgment flag Fout is turned OFF (Fout=OFF).

Also, the intention of the driver may be judged based on the steering wheel steering torque. In this way, when departure judgment flag Fout is ON, and it is judged that the driver has no intention to change lanes, departure judgment flag Fout is kept ON.

Then, in step S70, when the departure judgment flag Fout is ON, an audio or visual feedback is issued to the driver as an alarm to avoid departure from the lane.

As will be explained later, when departure judgment flag Fout is ON, application of a yaw moment to the vehicle is started as the lane departure prevention control, and the alarm issued while the yaw moment is applied to the vehicle. However, the alarm output timing is not limited to this scheme. For example, it may be issued earlier than when the application of a yaw moment starts.

Then, in step S80, a judgment is made as to whether deceleration control will be performed to decelerate the vehicle (hereinafter referred to as control of deceleration to prevent lane departure) as control for preventing lane departure. More specifically, a judgment is made as to whether the value obtained by subtracting threshold $X_L$, for judging the departure tendency, from estimated lateral displacement Xs computed in step S50 (that is, $|Xs|-X_L$) exceeds threshold $X_\beta$ for deceleration control judgment.

Figure 4:
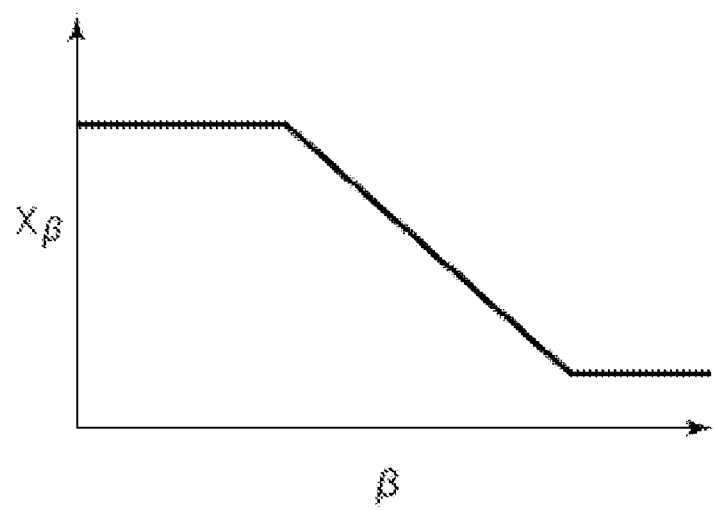
FIG. 4 is a diagram illustrating characteristics showing the relationship between travel lane curvature $\beta$ and threshold $X\beta$ for deceleration control judgment pertaining to an embodiment of the invention.

Here, threshold $X_\beta$ for deceleration control judgment is a value set according to travel lane curvature β. The relationship, for example, is shown in FIG. 4. As shown in FIG. 4, when travel lane curvature β is small, threshold $X_\beta$ for deceleration control judgment is kept at a constant large value. Also, when travel lane curvature β is larger than a certain value, threshold $X_\beta$ for deceleration control judgment decreases as travel lane curvature β increases. When travel lane curvature β becomes yet larger, threshold $X_\beta$ for deceleration control judgment is kept at a constant small value.

When the subtraction result ($|Xs|-XL$) meets or exceeds threshold $X_\beta$ for deceleration control judgment ($|Xs|-X_L \geq X_\beta$), it is determined that deceleration control will be performed, and deceleration control operation judgment flag Fgs is set ON. On the other hand, when the subtraction result ($|Xs|-X_L$) is lower than threshold $X_\beta$ for deceleration control judgment ($|Xs|-X_L<X_\beta$), it is determined that the deceleration control will not be performed. At the same time, deceleration control operation judgment flag Fgs is set OFF.

Here, when the estimated lateral displacement Xs obtained in step S50 meets or exceeds threshold $X_L$ for judging the departure tendency ($|Xs| \geq X_L$), departure judgment flag Fout is turned ON. When the subtraction result ($|Xs|-X_L$) meets or exceeds threshold $X_\beta$ for deceleration control judgment, deceleration control operation judgment flag Fgs is set ON. With respect to departure judgment flag Fout set in step S50, in this context when departure judgment flag Fout is set ON, this setting is made after deceleration control operation judgment flag Fgs is set ON. That is, with respect to application of the yaw moment to the vehicle when departure judgment flag Fout is turned ON, as will be explained later, the yaw moment is applied after the execution of deceleration control of the vehicle.

Then, reference target yaw moment M1 is computed in step S90. More specifically, the reference target yaw moment M1 is computed from estimated lateral displacement Xs and lateral departure threshold distance $X_L$ using the following equation (8):

$$M1=K1 \cdot K2 \cdot (|Xs|-X_L). \tag{8}$$

Figure 5:
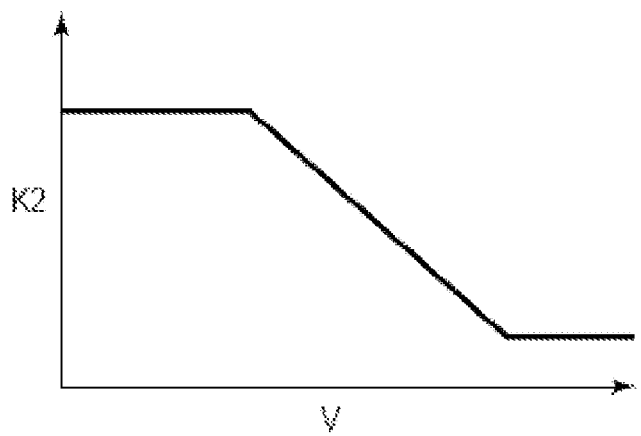
FIG. 5 is a diagram illustrating the characteristics showing the relationship between vehicle speed V and gain K2 pertaining to an embodiment of the invention.

Here, K1 represents a proportional gain depending on the various parameters of the vehicle. K2 represents a gain that varies according to vehicle speed V. FIG. 5 shows an example of gain K2. As shown in FIG. 5, gain K2 has a constant large value in the low speed region. When vehicle speed V exceeds a certain level, gain K2 decreases as vehicle speed V increases. Then, gain K2 becomes a constant small value when vehicle speed V reaches a certain level. According to equation (8), the larger the difference is between estimated lateral displacement Xs and lateral displacement threshold distance $X_L$, the larger is the reference target yaw moment M1.

In an initial step, corrected target yaw moment M2 is set to be computed reference target yaw moment M1. That is, corrected target yaw moment M2 to be applied to the vehicle is computed based on reference yaw moment M1 at first. Subsequently, corrected target yaw moment M2 is computed based on either the previous value of M2, or minimum control yaw moment Msm to adapt the vehicle control to the vehicle operating condition or the road condition. Additionally, in the initial step, minimum control yaw moment Msm is initially set as an initial value Msm0.

Then, in step S100, a judgment is made as to whether reference target yaw moment M1 is lower than a minimum target yaw moment Mmin, also called a prescribed threshold. If reference target yaw moment M1 is less than or equal to minimum target yaw moment Mmin, flow proceeds to step S110. On the other hand, if reference target yaw moment M1 exceeds minimum target yaw moment Mmin, flow proceeds to step S105.

In step S105, as shown in the following equation (9), select-high is performed for corrected target yaw moment M2 and minimum control yaw moment Msm. The larger of the two is taken as corrected target yaw moment M2. Processing then goes to step S150.

$$M2 \leftarrow \max(M2, Msm) \tag{9}$$

In step S110, time Ti is counted up, and processing then goes to step S120. It should be noted that if departure judgment flag Fout is changed from OFF to ON at step S80, time Ti is cleared to zero. That is, when it is judged that reference target yaw moment M1 is lower than minimum target yaw moment Mmin, a count of time Ti is started. Counting is performed continuously during the period when it is judged that reference target yaw moment M1 is lower than minimum target yaw moment Mmin.

Figure 6:
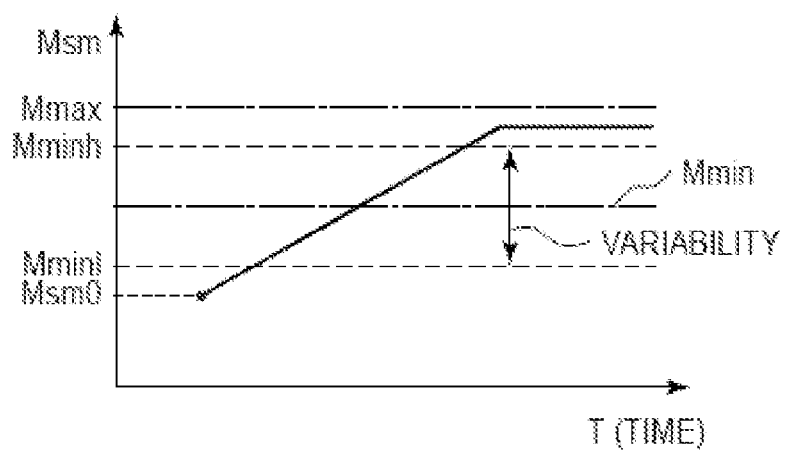
FIG. 6 is a diagram illustrating minimum control yaw moment Msm pertaining to an embodiment of the invention.

In step S120, minimum control yaw moment Msm is increased over time from its initial setting of Msm0 according to a table or function that can be mapped as shown in FIG. 6. This minimum control yaw moment Msm is set larger for a larger time Ti. Also, as shown in FIG. 6, initial value Msm0 of the minimum control yaw moment Msm is a value lower than minimum target yaw moment Mmin.

Minimum target yaw moment Mmin has an appropriate value such that when target yaw moment Msm is equal to Mmin and is applied to the vehicle, the driver can detect application of the yaw moment, which fosters increased driver alertness. The value of minimum target yaw moment Mmin is predetermined by experiment or the like. In other words, minimum target yaw moment Mmin is the value at which the driver will notice when the yaw moment is applied, or a value slightly larger.

For example, assume that the vehicle is controlled with the minimum target yaw moment Mmin being taken as the target value for control, and the yaw moment actually applied to the vehicle varies due to the roughness and lateral gradient or other external disturbance of the road surface. As shown in FIG. 6, the width of the variability of Msm is from yaw moment Mmin1 to yaw moment Mminh. On the other hand, as shown in FIG. 6, initial value Msm0 of minimum control yaw moment Msm is set at a value equal or near to yaw moment Mmin1, lower than minimum target yaw moment Mmin.

Also, as shown in FIG. 6, minimum control yaw moment Msm is set to increase to a value larger than minimum target yaw moment Mmin as time Ti becomes larger. Here, the upper threshold of minimum control yaw moment Msm is set at or near the maximum value of the control quantity caused by the variability assumed when minimum target yaw moment Mmin is taken as the target value As shown in FIG. 6, initial value Msm0 of minimum control yaw moment Msm is set at or near yaw moment Mmin1. When the yaw moment is applied to the vehicle, the initial value of the yaw moment actually applied to the vehicle has a value such that the driver does not notice application of the yaw moment. Then the yaw moment applied to the vehicle is increased over time, so that the driver notices application of the yaw moment. That is, initial value Msm0 of minimum control yaw moment Msm has a value equal to or near yaw moment Mmin1. As a result, even when there is variability in the yaw moment due to external disturbances, the initial value of the yaw moment actually applied to the vehicle is lower than minimum target yaw moment Mmin. Then the yaw moment actually applied to the vehicle becomes greater than minimum target yaw moment Mmin. As a result, it is possible to perform control favorable to the comfort of the driver.

In the embodiment explained above, initial value Msm0 of minimum control yaw moment Msm is set at or near yaw moment Mmin1 in order to realize control more favorable to the comfort of the driver. However, the embodiments are not limited to this scheme. Initial value Msm0 of minimum control yaw moment Msm may also have a value lower than minimum target yaw moment Mmin. The reason for this will be explained later. Also, as shown in FIG. 6, yaw moment Mmax is a yaw moment with an appropriate value such that when the target yaw moment Msm is less than Mmax, the driver does not feel uneasy when it is applied to the vehicle as the initial value. If the initial value of the target yaw moment for control is set at a value lower than minimum target yaw moment Mmin, even if variability in the yaw moment actually applied to the vehicle appears due to external disturbances, etc., the yaw moment actually applied to the vehicle still does not exceed yaw moment Mmax.

Figure 8:
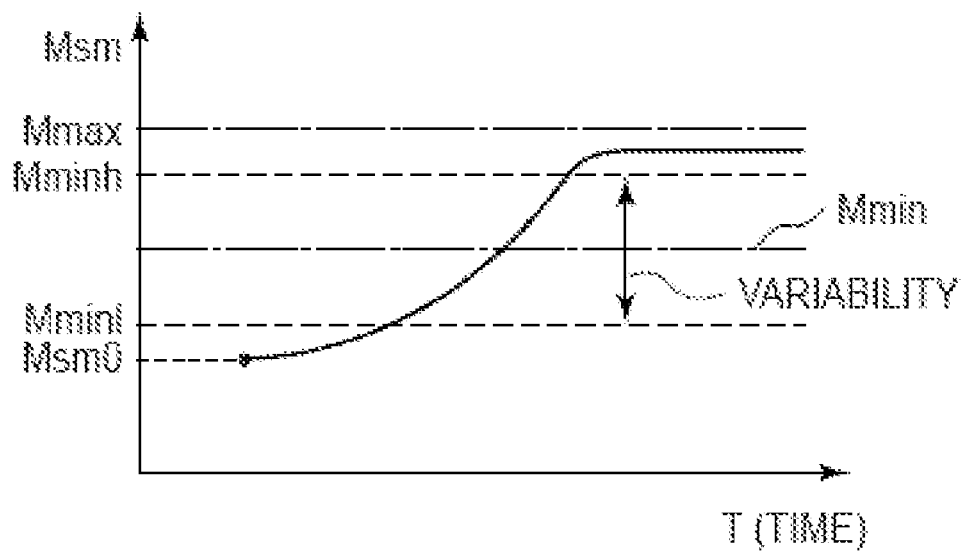
FIG. 8 is a diagram illustrating minimum control yaw moment Msm pertaining to another embodiment of the invention.

In the example shown in FIG. 6, because reference target yaw moment M1 is lower than minimum target yaw moment Mmin, minimum control yaw moment Msm rises linearly. As shown in FIG. 8, the increase in minimum control yaw moment Msm may also describe depicting a curve. That is, the rate of increase may vary over time. In the example shown in FIG. 8, the rate of increase of minimum control yaw moment Msm rises over time. Given the amount of increase in minimum control yaw moment Msm rises over time, the fact that the host vehicle has a lane departure tendency will be noticed by the driver more reliably.

Figure 9:
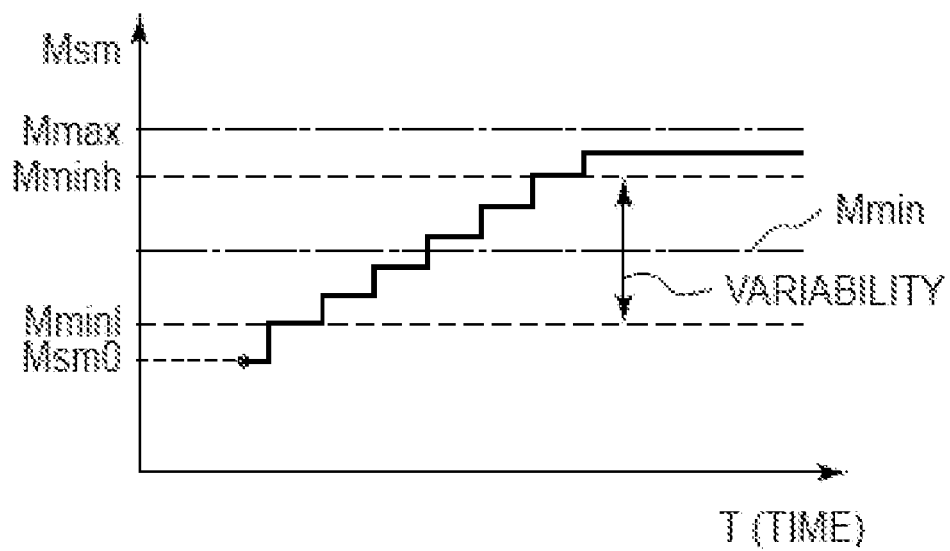
FIG. 9 is a diagram illustrating minimum control yaw moment Msm pertaining to another embodiment of the invention.

As shown in FIG. 9, minimum control yaw moment Msm may be set so that it increases stepwise. Based on road condition index value N, gain gr to be used in later step S140 is computed in step S130 using the following Equation (10):

$$gr = f3(N). \quad (10)$$

Here, function f3 is used to obtain gain gr based on road condition index value N. For example, it is a function that increases gain gr when road condition index value N is larger. That is, the greater the roughness of the road (the greater the bumps and dips in size and density) according to equation (3), the larger the value of gain gr.

Then, based on the following Equation (11), corrected target yaw moment M2 for which the setting is changed is computed in step S140. Here, gr represents the gain for correction.

$$M2 = gr \cdot Msm \quad (11)$$

Also, taking into consideration the relationship between Equations (11) and (10), when reference target yaw moment M1 is lower than minimum target yaw moment Mmin, the larger the road condition index value N, the larger the value of corrected target yaw moment M2.

Here, road condition index value N is an index value indicating the road surface state that influences the yaw moment noticed by the passengers of the vehicle (sensation of the passengers). That is, when the roughness of the road is high, the passengers will scarcely notice the change in the yaw moment. Consequently, based on road condition index value N, which is larger for higher roughness of the road surface, minimum control yaw moment Msm is multiplied by gain gr to compute corrected target yaw moment M2. Here, the roughness is higher for larger bumps and dips in the road or a greater frequency of the bumps and dips in the road.

As explained above, taking into consideration the influence of the roughness of the road on the sensations of the passengers, equation (11) is used to multiply minimum control yaw moment Msm by gain gr. When the sensations of the passengers are not taken into consideration, minimum control yaw moment Msm may be taken as corrected target yaw moment M2 as it is. That is, one may also adopt a scheme in which M2=Msm.

Then target yaw moment Ms as the final control quantity is computed in step S150. Using the following equation (12), final target yaw moment Ms (0) in the current round of processing is computed from the computed corrected target yaw moment M2 and target yaw moment Ms (−1) computed in the previous round of interrupt processing:

$$Ms(0) = f4(M2, Ms(-1)). \quad (12)$$

Here, function f4 is a function that correlates corrected target yaw moment M2 of the value computed in the current cycle of processing and target yaw moment Ms (−1) computed in the previous cycle of processing in a continuous way (with a linear or smooth curve relationship). When departure judgment flag Fout is ON, computing of the target yaw moment Ms (0) is performed. On the other hand, when departure judgment flag Fout is OFF, target yaw moment Ms (0) is set at 0.

Then the deceleration rate for the deceleration control to prevent lane departure is computed in step S160. The braking forces applied to the left and right wheels to decelerate the vehicle are computed. Here, the braking forces are computed as target brake hydraulic pressures Pgf, Pgr. Among these, target brake hydraulic pressure Pgf for the front wheels is computed from estimated lateral displacement Xs and lateral displacement threshold distance XL computed in step S4 and threshold $X_\beta$ for deceleration control judgment obtained in step S80 using the following equation (13):

$$Pgf = Kgv \cdot Kgx \cdot (|Xs| - X_L - X_\beta). \quad (13)$$

Figure 7:
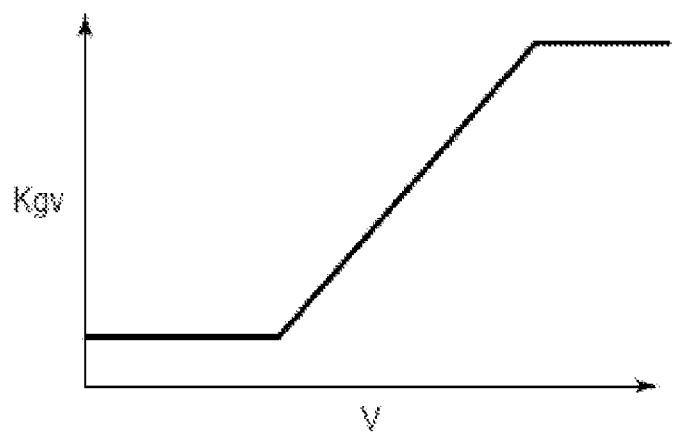
FIG. 7 is a diagram showing the relationship between vehicle speed V and conversion coefficient Kgv pertaining to an embodiment of the invention.

Here, Kgv represents the conversion coefficient set according to vehicle speed V, and Kgx represents the conversion coefficient determined by means of various vehicle parameters. FIG. 7 is a diagram illustrating an example of conversion coefficient Kgv. As shown in FIG. 7, in the low speed region conversion coefficient Kgv has a specific small constant value. On the other hand, when vehicle speed V is higher than a certain level, conversion coefficient Kgv increases together with vehicle speed V, and then when it reaches a certain vehicle speed V, conversion coefficient Kgv has a large constant value.

In addition, based on target brake hydraulic pressure Pgf for the front wheels computed in the above, target brake hydraulic pressure Pgr for the rear wheels is computed taking into consideration the front/rear distribution. In this way, the deceleration rate for avoiding departure (more specifically, target brake hydraulic pressures Pgf, Pgr) is obtained in step S160.

Then, the target brake hydraulic pressures for the various wheels are computed in step S170. That is, based on whether or not the braking control for preventing lane departure is occurring, the final brake hydraulic pressures are computed. When departure judgment flag Fout is OFF, that is, when a judgment result is obtained that there is no lane departure tendency, the following processing is performed. That is, based on the following Equations (14) and (15), target brake hydraulic pressures Psi (i=fl, fr, rl, rr) for the various wheels are set at brake hydraulic pressures Pmf, Pmr:

$$Psfl = Psfr = Pmf; \text{ and} \quad (14)$$

$$Psrl = Psrr = Pmr. \quad (15)$$

Here, Pmf represents the brake hydraulic pressure for the front wheels. Also, Pmr represents the brake hydraulic pressure for the rear wheels. These brake hydraulic pressures have values computed based on brake hydraulic pressure Pmf for the front wheels in consideration of the front/rear distribution. For example, when the driver depresses the brake pedal, brake hydraulic pressures Pmf, Pmr have values corresponding to the depression distance of the brake pedal.

On the other hand, when departure judgment flag Fout is ON, that is, when a judgment result is obtained that there is a lane departure tendency, the following processing is performed. That is, first of all, front-wheel target brake hydraulic pressure difference ΔPsf and rear-wheel target brake hydraulic pressure difference ΔPsr are computed based on target yaw moment Ms (target yaw moment Ms (0) in the current processing cycle). More specifically, target brake hydraulic pressure differences ΔPsf, ΔPsr are computed based on following Equations (16)-(19).

Namely, when |Ms|<Ms1, one has $$\Delta Psf = 0; \text{ and} \quad (16)$$

$$\Delta Psr = Kbr \cdot Ms/LTR; \text{ and} \quad (17)$$

when |Ms|≧Ms1, one has $$\Delta Psf = Kbf \cdot (Ms/|Ms|) \cdot (|Ms| - Ms1)/LTR; \text{ and} \quad (18)$$

$$\Delta Psf = Kbr \cdot (Ms/|Ms|) \cdot Ms1/LTR. \quad (19)$$

Here, Ms1 represents the setting threshold. Also, to simplify the explanation, it is assumed that front and rear wheels have the same tread LTR. Also, Kbf, Kbr represent the conversion coefficients for the front wheels and rear wheels, respectively, when the braking forces are converted to brake hydraulic pressures, and they are determined from the various brake parameters.

In this way, the braking forces generated at the wheels are distributed according to the magnitude of target yaw moment Ms. Then, when target yaw moment Ms is lower than setting threshold Ms1, front-wheel target brake hydraulic pressure difference ΔPsf is set at 0, and rear-wheel target brake hydraulic pressure difference ΔPsr has a prescribed value. As a result, a braking force difference is generated at the left and right rear wheels. Also, when target yaw moment Ms exceeds setting threshold Ms1, braking force differences are generated for the front/rear left and right wheels by setting target brake hydraulic pressure differences ΔPsf, ΔPsr at prescribed values.

Then the computed target brake hydraulic pressure differences ΔPsf, ΔPsr and target brake hydraulic pressures Pgf, Pgr are used to compute the final target brake hydraulic pressures Psi (i=fl, fr, rl, rr) of the various wheels. That is, deceleration control operation judgment flag Fgs set in step S80 is also taken as reference to compute the final target brake hydraulic pressures Psi (i=fl, fr, rl, rr) for the various wheels.

In the following, this case will be explained specifically for when the departure direction Dout is left (Dout=left).

First, the case will be explained in which departure judgment flag Fout is ON, that is, when there is a judgment result that a lane departure tendency exists while deceleration control operation judgment flag Fgs is OFF. In this case, only application of yaw moment to the vehicle is performed. Consequently, target brake hydraulic pressures Psi (i=fl, fr, rl, rr) for the various wheels are computed using the following equation (20).

$$Psfl = Pmf;$$

$$Psfr = Pmf + \Delta Psf;$$

$$Psrl = Pmr; \text{ and}$$

$$Psrr = Pmr + \Delta Psr. \quad (20)$$

In the following, the case will be explained in which departure judgment flag Fout is ON, and deceleration control operation judgment flag Fgs is also ON. In this case, the vehicle is decelerated while a yaw moment is applied to the vehicle. Consequently, target brake hydraulic pressures Psi (i=fl, fr, rl, rr) for the various wheels are computed based on the following equation (21):

$$Psfl = Pmf + Pgf/2;$$

$$Psfr = Pmf + \Delta Psf + Pgf/2;$$

$$Psr1 = Pmr + Pgr/2; \text{ and}$$

$$Psrr = Pmr + \Delta Psr + Pgr/2. \quad (21)$$

As shown in equations (20) and (21), in consideration of the braking operation performed by the driver, brake hydraulic pressures Psi (i=fl, fr, rl, rr) of the various wheels are computed in consideration of the brake hydraulic pressures Pmf, Pmr. Then, braking-driving force control unit 8 outputs the computed target brake hydraulic pressures Psi (I=fl, fr, rl, rr) for the various wheels as the brake hydraulic pressure instruction values sent to brake hydraulic pressure controller 7.

The target brake hydraulic pressures of the various wheels shown in equations (16)-(21) are for the case in which departure direction Dout is left (Dout=left), that is, when there is a lane departure tendency toward the left-hand side of the lane. An explanation with reference to equations corresponding to equations (16)-(21) is omitted here for a situation in which departure direction Dout is right (Dout=right), that is, when there is a lane departure tendency toward the right-hand side of the lane. When departure direction Dout is right, target brake hydraulic pressures Psi (i=fl, fr, rl, rr) for the various wheels corresponding to Equation (20) are computed based on the following Equation (22):

$$Psfl = Pmf + \Delta Psf;$$

$$Psfr = Pmf;$$

$$Psr1 = Pmr + \Delta Psr; \text{ and}$$

$$Psrr = Pmr. \quad (22)$$

The following is an explanation of the operation.

While the vehicle is running, various types of data are read (in step S10), and vehicle speed V is computed (step S20). Then, while a judgment is made on the lane departure tendency (step S50) based on estimated future lateral displacement Xs (estimated departure value) (setting of departure judgment flag Fout), the result of judgment of the lane departure tendency (departure judgment flag Fout) is corrected based on the intention of the driver to change lanes (step S60). Then an alarm is output based on the judgment result of the lane departure tendency (step S70).

Deceleration control operation judgment flag Fgs is set (step S80) based on the result of comparison of a value obtained by subtracting threshold $X_L$ for judging the departure tendency from estimated lateral displacement Xs (that is, $|Xs|-X_L$) and threshold $X_\beta$ for deceleration control judgment.

Also, computed reference target yaw moment M1 is taken as corrected target yaw moment M2 (step S90). In this case, when computed reference target yaw moment M1 is lower than minimum target yaw moment Mmin, preset minimum control yaw moment Msm is adopted to set corrected target yaw moment M2 (step S120).

In this case, minimum control yaw moment Msm is gradually increased over time from a value lower than minimum target yaw moment Mmin to a value over the minimum target yaw moment Mmin.

Then computed corrected target yaw moment M2 and target yaw moment Ms (−1) computed in the last processing cycle (processing for 1 cycle prior) are used to compute target yaw moment Ms (0) in the current processing cycle (step S150).

In addition, based on the state of departure judgment flag Fout and deceleration control operation judgment flag Fgs, target brake hydraulic pressures Psi (i=fl, fr, rl, rr) for the various wheels are computed based on target yaw moment Ms (target yaw moment Ms (0)) and the deceleration (target brake hydraulic pressure Pgf). The computed target brake hydraulic pressures Psi (i=fl, fr, rl, rr) are output to brake hydraulic pressure controller 7 (step S160). As a result, a yaw moment is applied corresponding to the lane departure tendency of the vehicle, and depending on the specific case, the vehicle is decelerated.

Here a yaw moment computing means is formed in step S90. The departure suppression control means is formed in steps S80, S150-S170. The control moment correction means is formed in steps S100-S120. Here, reference target yaw moment M1 is the computed yaw moment. Minimum target yaw moment Mmin is the prescribed threshold used in the control moment correction means.

When the control moment correction means judges that the yaw moment computed with the yaw moment computing means is lower than a prescribed threshold, it performs a correction so that the target yaw moment is continuously or intermittently increased over time from the value lower than the prescribed threshold to the value over the prescribed threshold.

That is, when reference target yaw moment M1 computed from the degree of departure tendency is lower than minimum target yaw moment Mmin as the prescribed threshold, target yaw moment Ms is increased slowly over time from the initial value lower than minimum target yaw moment Mmin.

As a result, first of all, it is possible to suppress initial target yaw moment Ms for departure prevention control (hereinafter also to be referred to as the target value). Consequently, even when there is variability such that the yaw moment actually applied to the vehicle when control for applying yaw moment to the vehicle is started (hereinafter to be referred to as the control quantity) exceeds the target value, it is still possible to suppress the uneasy feeling of the passengers caused by an excessively large control quantity applied to the vehicle (that is, the vehicle behavior) at the start of lane departure prevention control. The variability takes place, for example, due to tolerances in actuator control, a rough road surface, a lateral gradient, etc.

Target yaw moment Ms then rises slowly over time. As a result, the vehicle control quantity increases over time, and it is possible to prevent the vehicle from departing from the travel lane.

The minimum control yaw moment is set with an initial value lower than the prescribed threshold. When it is detected that the yaw moment computed using the yaw moment computing means is lower than a prescribed threshold, the minimum control yaw moment is continuously or intermittently increased over time from the value lower than the prescribed threshold to the value over the prescribed threshold. Then, when the yaw moment computed by the yaw moment computing means is lower than a prescribed threshold, the minimum control yaw moment is taken as the target yaw moment.

When the yaw moment computed corresponding to the departure tendency is lower than the prescribed threshold, the target yaw moment takes an initial value that is lower than the threshold value.

In this case, the target yaw moment is gradually increased. As a result, the initial target yaw moment is suppressed to a small amount, and the uneasy feeling of the passengers caused by the abrupt behavior of the vehicle at the start of lane departure prevention control is prevented. In addition, it is possible to prevent departure of the vehicle from the travel lane caused by an increase in the applied yaw moment if departure is not quickly eliminated, and it is thus possible to prevent uneasy feelings of the passengers.

Here, even when reference target yaw moment M1 remains in the state lower than minimum target yaw moment Mmin, minimum control yaw moment Msm continues to increase over time, and a yaw moment with a prescribed magnitude is applied to the vehicle. As a result, while lane departure is prevented, the driver is notified that the host vehicle may very possibly depart from the lane as a result of the vehicle behavior change caused by application of the yaw moment.

For example, when the degree of lane departure tendency (lateral displacement Xs) is small, and reference target yaw moment M1 continues to be lower than minimum target yaw moment Mmin, intrinsically, when the yaw moment (actual vehicle control quantity) applied to the vehicle is small, the driver can be notified that the host vehicle may very possibly depart from the lane by applying a yaw moment with a prescribed magnitude to the vehicle.

Here, the initial value of minimum control yaw moment Msm is set at a value lower than minimum target yaw moment Mmin. Consequently, when the value of reference target yaw moment M1 is between minimum control yaw moment Msm and initial value Msm0 of minimum control yaw moment Msm, the value of target yaw moment Ms is temporarily lower than the value of reference target yaw moment M1. Then, as minimum control yaw moment Msm increases over time, the yaw moment applied to the vehicle rises as described, and the aforementioned effects can be realized.

In this embodiment, initial value Msm0 of minimum control yaw moment Msm is set at a prescribed value. However, the invention is not limited to this scheme. For example, the following scheme may be adopted: reference target yaw moment M1 is taken as the initial value of minimum control yaw moment Msm, and minimum control yaw moment Msm is increased over time.

When the yaw moment computed by the yaw moment computing means exceeds the prescribed threshold, the yaw moment computed with the yaw moment computing means or the minimum control yaw moment, whichever is larger, is taken as the target yaw moment.

Figure 10A:
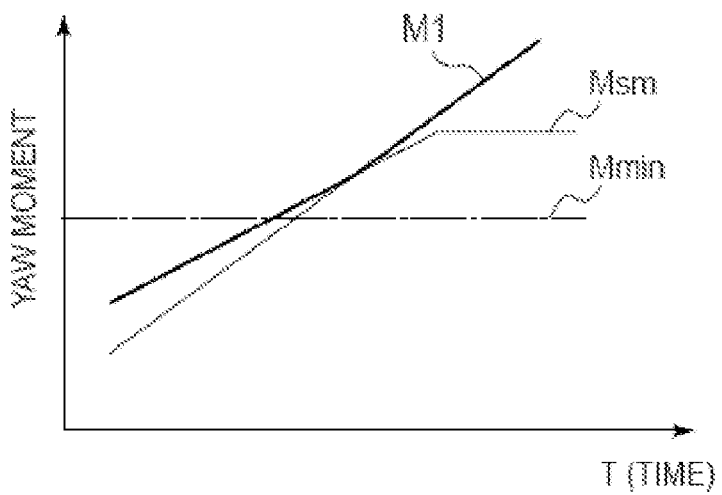
FIGS. 10A and 10B are time charts illustrating the target yaw moment.
Figure 10B:
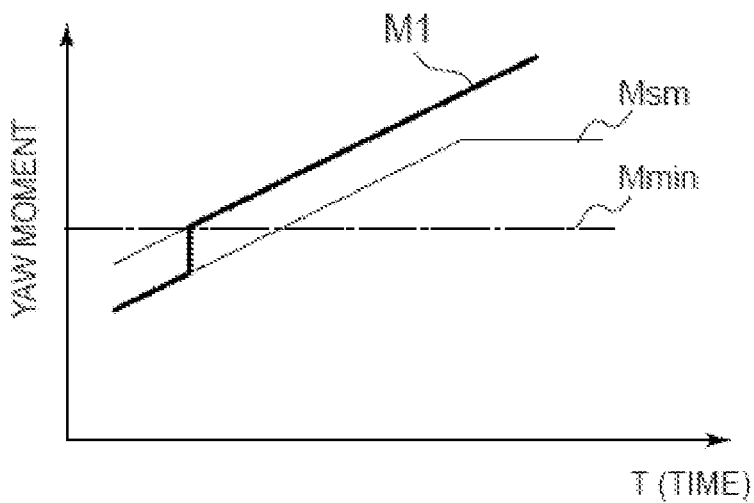

FIGS. 10A and 10B are time charts illustrating an example of this case.

When reference target yaw moment M1 is taken as a target value when the yaw moment of the vehicle is controlled, there are the following problems. When variability caused by actuator control tolerances, road surface roughness, lateral gradients, etc., occurs such that the actual return quantity (control quantity) is lower than the target value the vehicle has difficulty returning to the center of the lane, and the passengers feel uneasy. Also, when the computed reference target yaw moment M1 is smaller, that is, when the target value is lower, the uneasy feeling of the passengers caused by the variability can be assumed to be more significant. That is, when the yaw moment of the vehicle is controlled with reference target yaw moment M1 computed based on the degree of the departure tendency being taken as the target value, the target value is also smaller when the degree of departure tendency is lower. Consequently, when the variability is large due to external disturbances from road surface roughness and lateral gradients, etc., the yaw moment of the vehicle is cancelled, no variation takes place in the control quantity of the vehicle, and the passengers feel uneasy.

Consequently, in this embodiment, minimum control yaw moment Msm increases over time from an initial value lower than minimum target yaw moment Mmin. Also, when reference target yaw moment M1 computed based on the degree of departure tendency becomes lower than minimum control yaw moment Msm, the minimum control yaw moment Msm is taken as target yaw moment Ms.

As a result, because reference target yaw moment M1 computed based on the lane departure tendency has a small value, the target value still gradually becomes larger even when the vehicle returns to the center of the lane with difficulty. That is, reference target yaw moment M1 computed based on the lane departure tendency of the vehicle decreases, and even when the vehicle control quantity can hardly be generated, the control quantity still becomes larger due to a gradual rise of the target value. As a result, it is possible to apply a yaw moment to the vehicle appropriate for preventing departure of the vehicle from the travel lane, and at the same time, it is possible to suppress the uneasy feeling of the passengers caused by difficulty in keeping the vehicle in the center of the lane.

To improve the effect of making the passengers aware of the possibility of departure from the lane, minimum control yaw moment Msm is initially set at a value significantly larger than minimum target yaw moment Mmin when reference target yaw moment M1 computed based on the degree of the departure tendency is lower than minimum target yaw moment Mmin. In this case, it is possible to improve the effect of notifying the passengers about the possibility of departure from the lane. However, when the actual control quantity of the vehicle becomes a control quantity higher than the target value due to control variability, it is possible for an excessive yaw moment to be generated, and sudden behaviors of the vehicle take place. On the other hand, according to the present embodiment, minimum control yaw moment Msm is gradually increased over time from a value lower than minimum target yaw moment Mmin, and when reference target yaw moment M1 computed based on the degree of the departure tendency is lower than minimum control yaw moment Msm, the minimum control yaw moment Msm is taken as target yaw moment Ms. Consequently, it is possible to gradually increase the control quantity applied to the vehicle and to notify the passengers of the possibility of departure from the lane. As a result, the aforementioned problem can be solved.

When the minimum control yaw moment exceeds the prescribed threshold, the yaw moment computed with the yaw moment computing means or the minimum control yaw moment, whichever is larger, is taken as the target yaw moment.

Figure 11A:
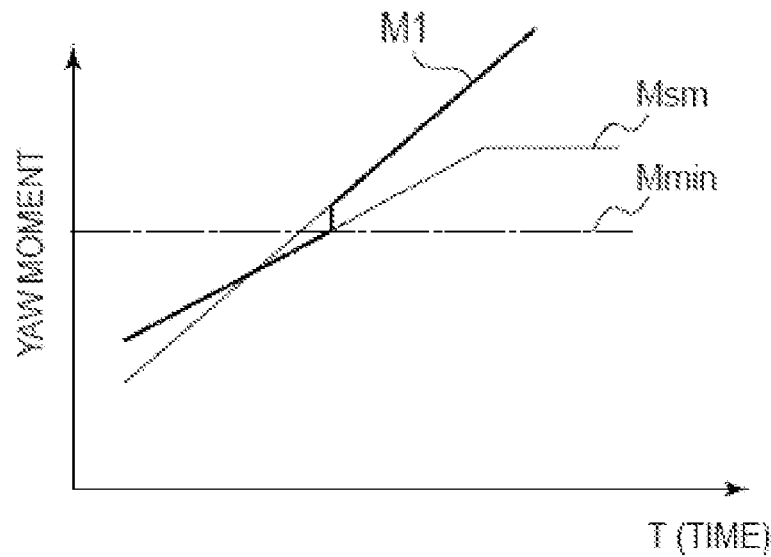
FIGS. 11A and 11B are time charts illustrating the target yaw moment.
Figure 11B:
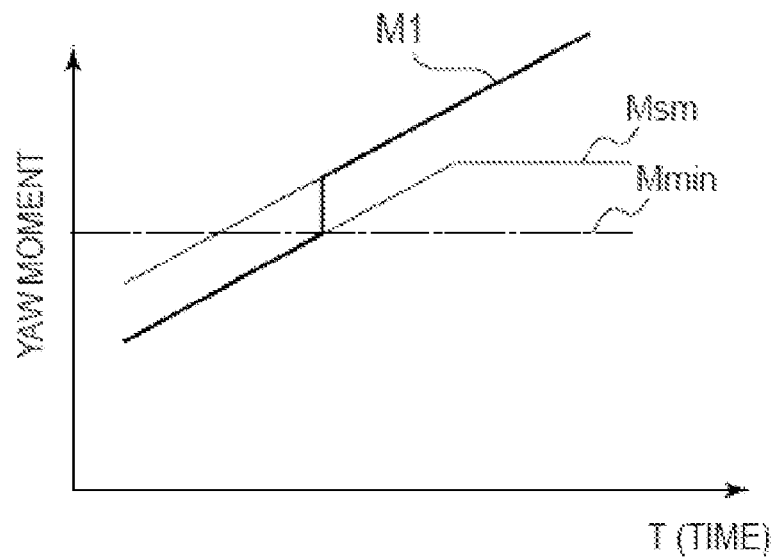

FIGS. 11A and 11B are time charts illustrating an example of this case.

Minimum control yaw moment Msm is increased over time from an initial value lower than minimum target yaw moment Mmin. Also, when reference target yaw moment M1 computed based on the degree of departure tendency is lower than minimum control yaw moment Msm, the minimum control yaw moment Msm is taken as target yaw moment Ms.

As a result, because reference target yaw moment M1 computed based on the lane departure tendency has a small value, the target value still gradually becomes larger even when the vehicle has difficulty returning into the center of the lane. That is, even when reference target yaw moment M1 computed based on the lane departure tendency of the vehicle is small and the control quantity can hardly be generated in the vehicle, the control quantity still becomes larger due to a gradual increase of the target value. As a result, it is possible to apply to the vehicle only the yaw moment appropriate for preventing the vehicle from departing from the travel lane, and at the same time it is possible to suppress the uneasy feelings of the passengers caused by the fact that the vehicle has difficulty returning to the center of the lane.

The initial value of the minimum control yaw moment is the value determined such that the yaw moment actually being applied to the vehicle when the value is set at the target value is lower than the prescribed threshold. That is, the initial value of minimum control yaw moment Msm is smaller than minimum target yaw moment Mmin such that the actual vehicle control quantity becomes a value lower than minimum target yaw moment Mmin.

As a result, even when due to variability the actual control quantity of the vehicle becomes a control quantity higher than the target value, limitation to a magnitude near minimum target yaw moment Mmin is still possible. As a result, the control quantity actually applied to the vehicle in the initial stage of control is reliably set at a high control quantity. As a result, it is possible to eliminate or suppress the uneasy feelings of the passengers due to the behavior of the vehicle.

That is, even when the actual control quantity of the vehicle becomes larger than the initial value of minimum control yaw moment Msm due to variability, by setting the initial value of minimum control yaw moment Msm such that the actual control quantity of the vehicle becomes equal to or near minimum target yaw moment Mmin, it is possible to limit the initial value to near minimum target yaw moment Mmin even when the control quantity becomes higher due to variability. Also, the control response is improved when the hydraulic pressure of the brakes rises as much as possible initially.

The minimum control yaw moment is corrected to a value that is larger when the roughness of the road surface is great. That is, as explained above, corrected target yaw moment M2 is computed as the product of minimum target yaw moment Mmin and gain gr (equation (14)). As a result, the greater the roughness of the road, the larger the gain gr. Consequently, corrected target yaw moment M2 also becomes larger.

When the roughness of the road becomes greater, the driver has more difficulty noticing the change in vehicle behavior due to the application of a yaw moment. That is, while it becomes more and more difficult for the driver to realize the high likelihood of departure of the host vehicle from the lane, the value of corrected target yaw moment M2 (more specifically, target yaw moment Ms (0)), becomes larger as the road roughness increases. As such, even when the road roughness is high, the driver can still perceive the high likelihood of the host vehicle departing from the lane by means of the change in vehicle behavior due to the application of a yaw moment.

As shown in FIG. 8, the rate of increase of minimum control yaw moment Msm rises over time. As a result, the longer the time from the when the vehicle displays the lane departure tendency until the passengers recognizes the lane departure tendency of the vehicle, the greater the rate of increase of minimum control yaw moment Msm. As a result, the yaw moment applied to the vehicle becomes larger, so that the passengers can recognize the lane departure tendency of the vehicle with high reliability.

It is possible to prevent an excessive control quantity by setting an upper threshold. The maximum value of the minimum control yaw moment is restricted to a value over the prescribed threshold.

Here, the following scheme may be adopted. From the time that departure judgment flag Fout is turned ON, an increase of the minimum control yaw moment Msm is begun, and this minimum control yaw moment Msm or the reference yaw moment M1, whichever is larger, is taken as the target yaw moment.

Figure 12A:
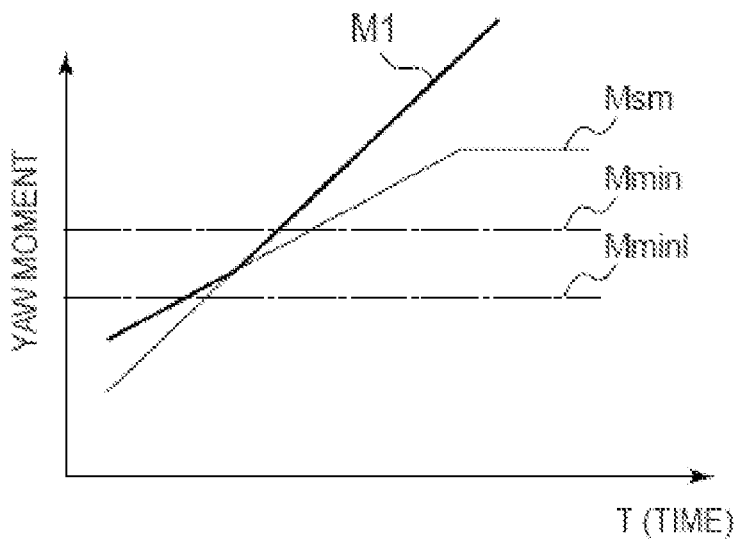
FIGS. 12A and 12B are time charts illustrating the target yaw moment.
Figure 12B:
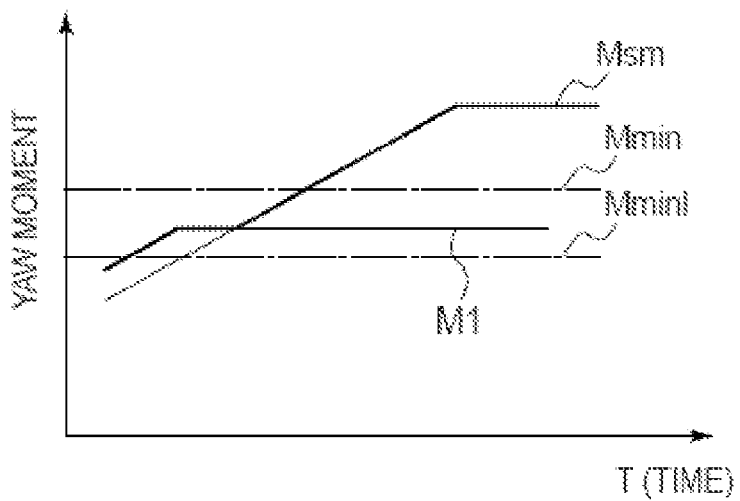

FIGS. 12A and 12B are time charts illustrating an example of this case.

Figure 13:
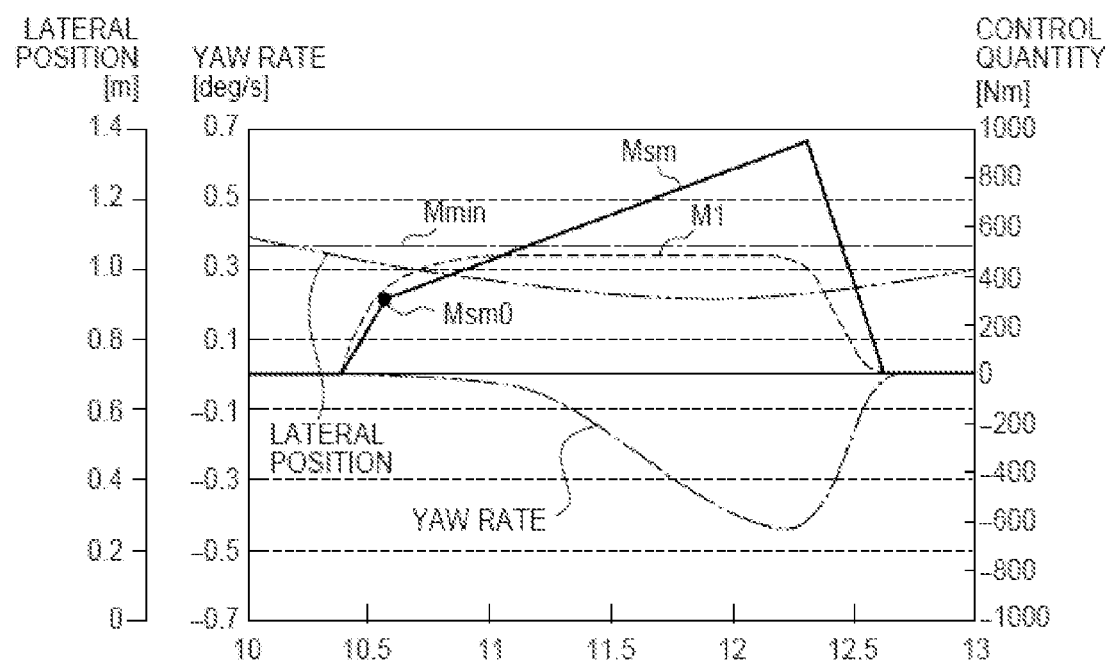
FIG. 13 is a time chart illustrating an example of an embodiment of the invention.

FIG. 13 is a time chart illustrating an example in which the present embodiment is applied. As can be seen from FIG. 13, computed reference target yaw moment M1 increases according to the degree of the departure tendency. However, when computed reference target yaw moment M1 is lower than minimum target yaw moment Mmin, the yaw moment of the vehicle is controlled based on minimum control yaw moment Msm. Consequently, even when reference target yaw moment M1 is lower than minimum target yaw moment Mmin, the yaw moment applied to the vehicle still increases along minimum control yaw moment Msm. As a result, it is possible to prevent deviation or departure of the vehicle.

That is, at the start of control there is no excessive vehicle behavior, and the control quantity increases towards the latter half of the control. As a result, it is possible to realize the effects of returning the vehicle. It is also possible to improve the effect of notifying the passengers of the possibility of deviation or departure.

That is, as can be seen from FIG. 13, even when reference target yaw moment M1 is lower than minimum target yaw moment Mmin, minimum control yaw moment Msm increases over time from initial value Msm0 that is lower than minimum target yaw moment Mmin to a value that exceeds minimum target yaw moment Mmin. As a result, generally speaking, it is increased and corrected to minimum control yaw moment Msm that exceeds computed reference target yaw moment M1, and deviation is suppressed. Also, initial value Msm0 of minimum control yaw moment Msm is set at a value lower than minimum target yaw moment Mmin, and excessive vehicle behavior at the start of control is suppressed.

In the example shown in FIG. 13, when computed reference target yaw moment M1 is below minimum target yaw moment Mmin, the yaw moment of the vehicle is controlled based on minimum control yaw moment Msm. However, the embodiments are not limited to this scheme. Control may be performed such that when computed reference target yaw moment M1 is smaller than a yaw moment that might possibly generate excessive vehicle behavior at the start of control, control is performed based on reference target yaw moment M1 or minimum control yaw moment Msm, whichever is larger.

Figure 14:
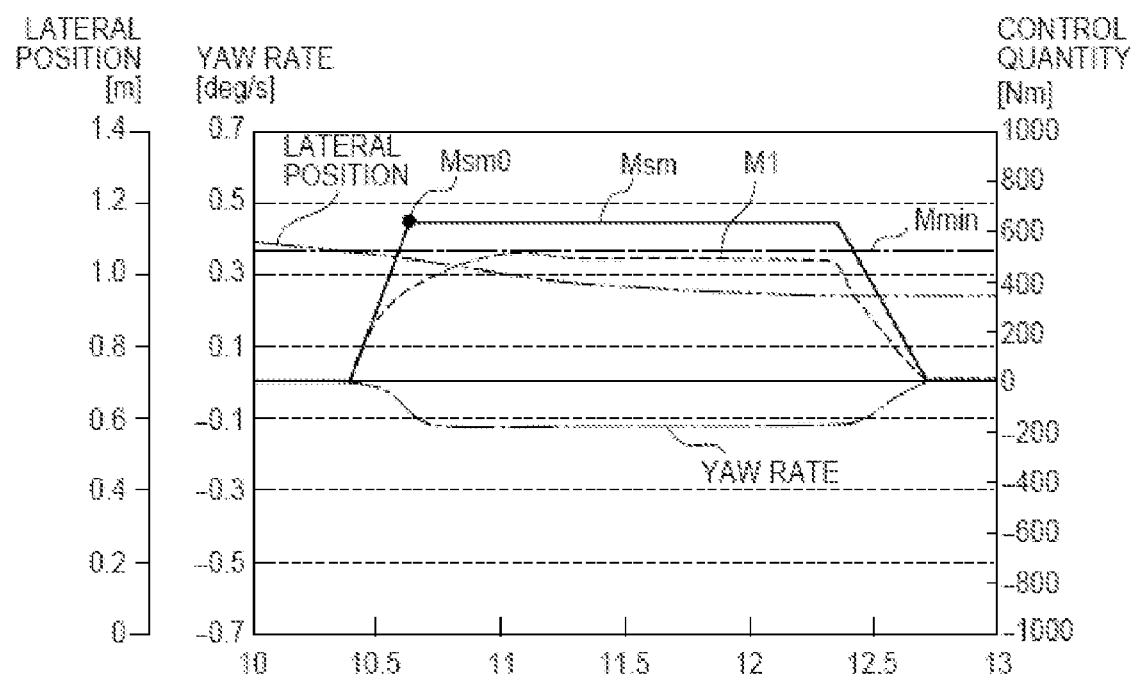
FIG. 14 is a time chart illustrating a comparative example.

FIG. 14 is a diagram illustrating a comparative example. In this comparative example, in order to improve the effect of notifying the passengers of the possibility of deviation, when reference target yaw moment M1 is lower than minimum target yaw moment Mmin, it is increased and corrected to constant minimum target yaw moment Mmin uniformly.

In this case, while it is possible to improve the effect of notifying the passengers of the deviation possibility, the yaw rate rises in a single stroke at the start of control. Consequently, there may be excessive vehicle behavior at the start of control.

In the examples shown in FIGS. 13 and 14, minimum control yaw moment Msm is gradually increased to initial value Msm0 of the minimum control yaw moment at a prescribed time from the start of control. However, the embodiments are not limited to this scheme. In the example shown in FIG. 13, initial value Msm0 of minimum control yaw moment Msm has a value sufficiently smaller than minimum target yaw moment Mmin. Consequently, even when minimum control yaw moment Msm is set at initial value Msm0 from the start of control, there is no excessive vehicle behavior at the start of control. Consequently, minimum control yaw moment Msm at the start of control may be set at initial value Msm0.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A lane departure prevention controller for a vehicle, comprising:
   a lane departure tendency determining device configured to determine a departure tendency of the vehicle to depart from a travel lane;
   a yaw moment computing device configured to compute a reference yaw moment based on the departure tendency;
   a yaw moment correction device configured to compute a target yaw moment based on at least the reference yaw moment; and
   a controller configured to apply the target yaw moment to the vehicle;
   wherein when the reference yaw moment computed by the yaw moment computing device is lower than a prescribed threshold, the yaw moment correction device is further configured to gradually increase the target yaw moment over time until the target yaw moment is greater than the prescribed threshold.

2. The lane departure prevention controller of claim 1 wherein the yaw moment correction device is further configured to set a minimum control yaw moment used to compute the target yaw moment.

3. The lane departure prevention controller of claim 2 wherein, when the reference yaw moment computed by the yaw moment computing device exceeds the prescribed threshold, the yaw moment correction device is further configured to set the target yaw moment based on the larger of the reference yaw moment computed with the yaw moment computing device and the minimum control yaw moment set by the yaw moment correction device.

4. The lane departure prevention controller of claim 2 wherein when the reference yaw moment set by the yaw moment correction device exceeds the prescribed threshold, the yaw moment correction device is further configured to set the target yaw moment based on the larger of the reference yaw moment computed with the yaw moment computing device and the minimum control yaw moment set by the yaw moment correction device.

5. The lane departure prevention controller of claim 2 wherein the yaw moment correction device is configured to gradually increase the target yaw moment over time by calculating a gain in the minimum control yaw moment over time.

6. The lane departure prevention controller of claim 5 wherein the minimum control yaw moment increases when a road surface friction coefficient increases.

7. The lane departure prevention controller of claim 5, wherein a rate of increase of the minimum control yaw moment increases over time.

8. The lane departure prevention controller of claim 5 wherein the minimum control yaw moment increases as a road condition index value increases.

9. The lane departure prevention controller of claim 5 wherein the minimum control yaw moment increases one of linearly and step-wise over time.

10. A method of preventing departure of a vehicle from a travel lane comprising:
    determining the departure tendency of the vehicle to depart from the travel lane with a lane departure tendency determining device;
    calculating a reference yaw moment based on the degree of the departure tendency with a yaw moment computing device;
    calculating a target yaw moment based on at least the reference yaw moment with a yaw moment correction device, wherein the target yaw moment is gradually increased over time by the yaw moment correction device when the reference yaw moment is lower than a prescribed threshold, until the target yaw moment exceeds the prescribed threshold irrespective of the departure tendency; and
    applying the target yaw moment to the vehicle.

11. The lane departure prevention control method of claim 10, further comprising:
    setting the target yaw moment with the yaw moment correction device based on the larger of the reference yaw moment calculated based on the departure tendency and the target yaw moment that was gradually increased when the reference yaw moment exceeds the prescribed threshold.

12. The lane departure prevention control method of claim 10, further comprising:
    setting a minimum control yaw moment with the yaw moment correction device; and wherein when the reference yaw moment exceeds the prescribed threshold, calculating the target yaw moment comprises setting the target yaw moment based on the larger of the reference yaw moment and the minimum control yaw moment.

13. The lane departure prevention control method of claim 12 wherein the minimum control yaw moment is increased as a road surface friction coefficient increases.

14. The lane departure prevention control method of claim 12 wherein the minimum control yaw moment is increased with time.

15. The lane departure prevention control method of claim 14 wherein gradually increasing the target yaw moment comprises calculating a gain in a minimum control yaw moment over time.

16. A lane departure prevention controller for a vehicle, comprising:
    means for determining a departure tendency of the vehicle;
    means for computing a reference yaw moment based on the departure tendency of the vehicle;
    means for computing a target yaw moment based on at least the reference yaw moment; and
    means for applying the target yaw moment to the vehicle, wherein when the reference yaw moment is lower than a prescribed threshold, the means for computing the target yaw moment is configured to gradually increase the target yaw moment over time until the target yaw moment is greater than the prescribed threshold.

17. The lane departure prevention controller of claim 16 wherein the means for computing the target yaw moment further comprises means for setting a minimum control yaw moment, wherein the minimum control yaw moment is also used to compute the target yaw moment.

18. The lane departure prevention controller of claim 17 wherein when the reference yaw moment exceeds the prescribed threshold, the means for computing the target yaw moment further comprises means for setting the target yaw moment based on the larger of the reference yaw moment and the minimum control yaw moment.

* * * * *